United States Patent [19]

Davis et al.

[11] 4,288,418

[45] Sep. 8, 1981

[54] PROCESS FOR MANUFACTURING TITANIUM DIOXIDE

[75] Inventors: Brian R. Davis, Bricktown; Joseph A. Rahm, Long Branch, both of N.J.

[73] Assignee: NL Industries, Inc., New York, N.Y.

[21] Appl. No.: 202,039

[22] Filed: Oct. 29, 1980

Related U.S. Application Data

[63] Continuation of Ser. No. 65,450, Aug. 10, 1979, abandoned.

[51] Int. Cl.³ .......................................... C01G 23/053
[52] U.S. Cl. ............................................ 423/83; 423/82; 423/85; 423/86
[58] Field of Search ........................ 423/82, 83, 85, 86

[56] References Cited

U.S. PATENT DOCUMENTS

| | | | |
|---|---|---|---|
| 1,338,473 | 4/1920 | Wrigley et al. | 423/83 |
| 1,504,669 | 8/1924 | Blumenfeld | 106/300 |
| 1,504,671 | 8/1924 | Blumenfeld | 106/300 |
| 2,617,724 | 11/1952 | Espenschied | 423/82 |
| 3,071,439 | 1/1963 | Solomka | 423/610 |
| 3,647,414 | 3/1972 | Nilsen | 423/83 |
| 3,784,670 | 1/1974 | Yamada et al. | 423/82 |

FOREIGN PATENT DOCUMENTS 592756  2/1978  U.S.S.R. ............................. 423/82

Primary Examiner—Herbert T. Carter
Attorney, Agent, or Firm—Gary M. Nath; Claude L. Beaudoin

[57] ABSTRACT

A process is provided for the manufacture of titanium dioxide pigment wherein excess ilmenite ore is reacted with dilute sulfuric acid having a concentration of between about 25% and about 60% by weight and in preferably at least two stages wherein the first stage is maintained at a temperature up to about 140° C. and the second stage is conducted at a lower temperature (than the first stage) which is below about 100° C. to provide a salt solution of titanium and iron. Thereafter, the titanium is hydrolyzed to provide titanium dioxide hydrate accompanied by recycling the spent acid from the hydrolysis for reaction with the ilmenite ore charged to the process. The titanium hydrate is calcined to provide titanium dioxide pigment.

12 Claims, 1 Drawing Figure

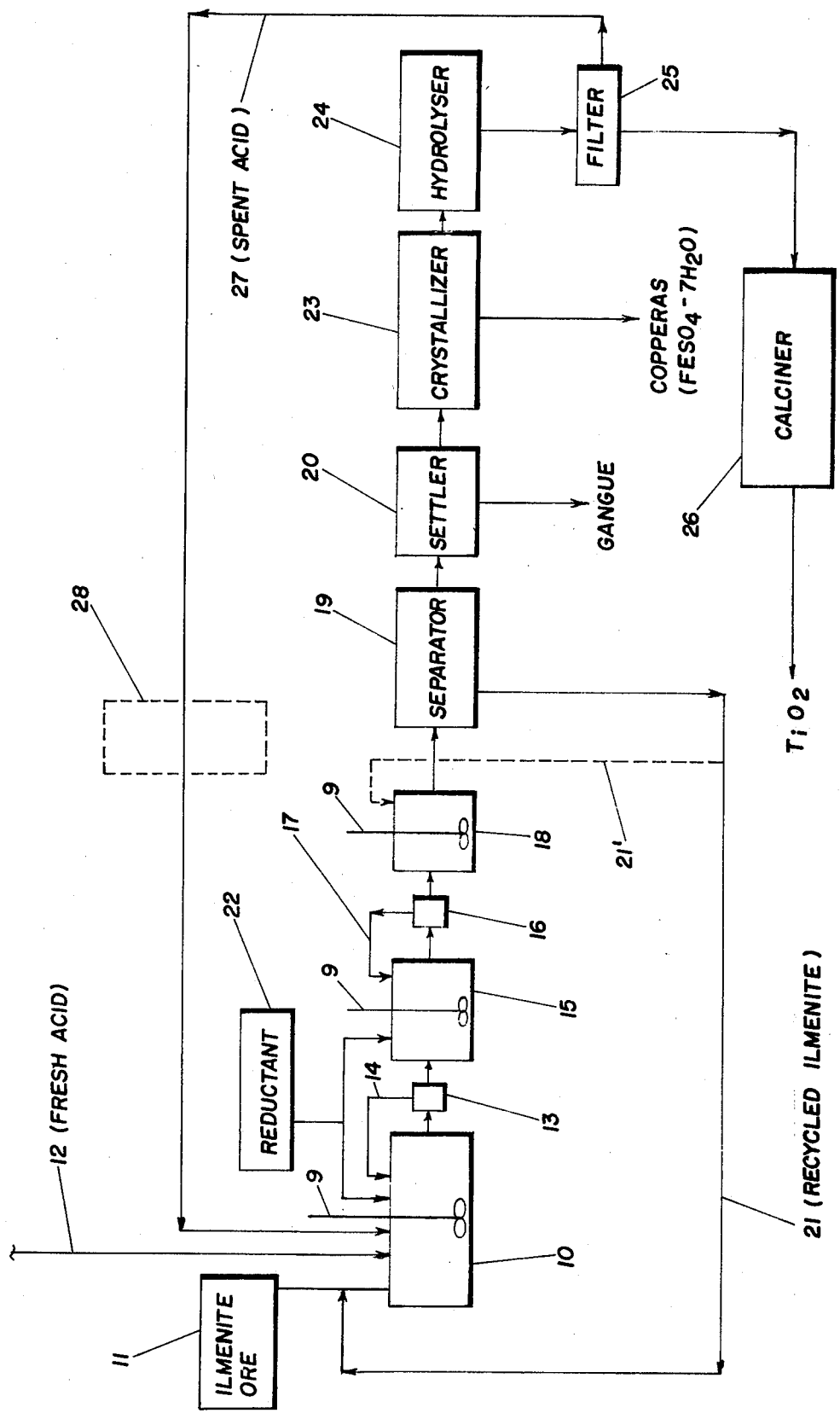

PROCESS FOR MANUFACTURING TITANIUM DIOXIDE

This is a continuation, of application Ser. No. 65,450, filed Aug. 10, 1979, now abandoned.

FIELD OF THE INVENTION

The present invention relates to the manufacture of titanium dioxide pigmentary material. More particularly, the present invention is directed to a novel process for reacting ilmenite ore with dilute sulfuric acid for preparing salt solutions of titanium that may be hydrolyzed to provide titanium dioxide pigment.

BACKGROUND OF THE INVENTION

Titanium dioxide is a well known material having desirable pigment properties and useful in paint and coating compositions and in plastics materials. Several different processes are known for manufacturing titanium dioxide material including, for example, the sulphate process and the chloride process. The present invention concerns the manufacture of titanium dioxide by the sulphate process.

The usual sulphate process for the manufacture of titanium dioxide involves the initial step of reacting a titanium bearing ore such as ilmenite with concentrated sulfuric acid (e.g., 90%–96% sulfuric acid). The reaction is sometimes referred to as "digestion" or "ore digestion." The digestion reaction of ilmenite ore and concentrated sulfuric acid is exothermic in nature and proceeds very violently. Typically, the ilmenite ore and the concentrated sulfuric acid are placed in a reaction vessel called a digestion tank. Water is usually added to the digestion tank to initiate and accelerate the acid-ore reaction because of the generation of a large quantity of heat which results in a vigorous boiling action of the water-acid solution at about 100° C. to about 190° C. and the release of vast quantities of steam and vapor having entrained particulate material. As the violent reaction proceeds, water is expelled and the reaction mass becomes solid; the reaction is completed in the solid phase at a temperature of approximately 180° C. The solid reaction mass, referred to as a "cake," is allowed to cool. Thereafter, the solid cake is dissolved with water or dilute acid to provide a solution of sulphate salts of iron, titanium and other trace metals present in the ilmenite ore. The digestion operation is a batch procedure carried out in a single digestion tank. As many digestion tanks are used as necessary according to the desired capacity of the manufacturing plant.

After digestion, the resulting sulphate salt solution (i.e., of iron and titanium, etc.) is further processed by known measures to remove the ferrous sulphate, usually referred to as "copperas," to provide a solution of titanyl sulphate which, upon hydrolysis, yields hydrated titanium dioxide. The titanium dioxide hydrate is usually subjected to a calcination treatment in a suitable kiln device to remove the water of hydration and to provide the anhydrous titanium dioxide pigment. The foregoing process is described in greater detail in, for example, U.S. Pat. Nos. 1,504,672; 3,615,204 and 3,071,439.

The sulphate process for the manufacture of titanium dioxide pigment described hereinabove has several environmental drawbacks. For example, the violent reaction that occurs in the digestion tank results in undesirable emission problems. Also, solutions of dilute sulfuric acid, usually termed "spent acid," that result from the removal of copperas and the hydrolysis of the titanyl sulphate present severe disposal problems because large quantities of such spent acid cannot be recycled to the digestion tank, which utilizes concentrated sulfuric acid, or reclaimed on an economic basis.

Accordingly, it is the principle object of the present invention to provide a novel sulphate process for manufacturing titanium dioxide pigment that substantially avoids or eliminates the drawbacks mentioned hereinabove of the conventional sulphate process.

The Invention

According to the present invention, there is provided a process which comprises reacting
  ilmenite, in an amount up to 400% excess of the stoichiometric amount of ilmenite necessary to react with sulfuric acid to provide titanyl sulphate, and
  dilute sulfuric acid solution having a concentration between about 25% and about 60% by weight, based upon the total weight of said solution,
at a temperature between about 65° C. and the boiling point of said solution, and thereafter cooling the resulting reaction solution to a temperature below 100° C.

In the preferred embodiment, the process of the present invention comprises (1) reacting
  ilmenite, in an amount up to about 400% in excess of the stoichiometric amount of ilmenite necessary to react with sulfuric acid to provide titanyl sulphate, and
  dilute sulfuric acid solution having a concentration between about 25% and about 60% by weight, based upon the total weight of said solution, at a temperature between about 65° C. and the boiling point of said solution, and thereafter cooling the resulting reaction solution to a temperature below 100° C.

In a preferred embodiment, the process of the present invention comprises (1) reacting
  ilmenite in an amount up to about 400% in excess of the stoichiometric amount of ilmenite necessary to react with sulfuric acid to provide titanyl sulphate, and
  dilute sulfuric acid solution having a concentration between about 25% and about 60% by weight, based upon the total weight of said solution,
at a temperature between about 65° C. and the boiling point of said solution; (2) cooling said reaction solution to a temperature below 80° C.; (3) removing iron sulphate from said reaction solution to provide a titanyl sulphate solution; (4) hydrolyzing said titanyl sulphate solution to provide a hydrate of titanium dioxide; and (5) calcining said hydrate of titanium dioxide to provide titanium dioxide.

In another preferred embodiment, the present invention provides a continuous process comprising:
  (1) reacting (a) ilmenite, in an amount up to about 400% in excess of the stoichiometric amount of ilmenite necessary to react with sulfuric acid to provide titanyl sulphate, and (b) dilute sulfuric acid solution having a concentration between about 25% and about 60% by weight, based upon the total weight of said solution, at a temperature between about 65° C. and the boiling point of said solution;
  (2) cooling the resulting reaction mixture from (1) to a temperature below about 80° C. in a second reaction vessel;

(3) separating unreacted ilmenite from the reaction mixture of (2) to provide a solution of iron sulphate and titanyl sulphate and recycling said unreacted ilmenite to step (1);

(4) removing iron sulphate from said solution of iron sulphate and titanyl sulphate to provide a solution of titanyl sulphate;

(5) hydrolyzing said titanyl sulphate solution from step (4) to provide a titanium dioxide hydrate, and recycling spent sulfuric acid to step (1); and (6) calcining said titanium dioxide hydrate to provide titanium dioxide.

In a most preferred embodiment, the present invention provides a continuous process for producing titanium dioxide pigment which comprises:

(1) reacting (a) ilmenite, in an amount up to about 400% in excess of the stoichiometric amount of ilmenite necessary to react with sulfuric acid to provide titanyl sulphate, and (b) dilute sulfuric acid solution having a concentration between about 25% and about 60% by weight, based upon the total weight of said solution, in a first reaction vessel at a temperature up to the boiling point of said solution to provide a reaction solution having a ratio of active acid to titanium dioxide of about 3.0;

(2) continuously transporting said reaction solution from said first reaction vessel to a second reaction vessel, and recycling a portion of unreacted ilmenite to (1);

(3) continuing said reaction of ilmenite and dilute sulfuric acid in said second reaction vessel at a temperature below about 90° C. to provide a reaction solution having a ratio of active acid to titanium dioxide of about 2.0;

(4) separating unreacted ilmenite from the reaction mixture of (3) to provide a solution of iron sulphate and titanyl sulphate, and recycling said unreacted ilmenite to (3) or (1);

(5) cooling the reaction solution of (4) to crystallize iron sulphate;

(6) filtering the reaction mixture of (5) to remove iron sulphate crystals and provide a solution of titanyl sulphate;

(7) hydrolyzing said solution of titanyl sulphate from (6) to provide a titanium dioxide hydrate, and recycling spent sulfuric acid to (1); and (8) calcining said titanium dioxide hydrate from (7) to provide titanium dioxide.

DETAILED DESCRIPTION OF INVENTION

The nature and advantages of the process of the present invention will be more clearly understood from the following description and the accompanying flow chart which depicts the active features of the process.

Referring to the process flow chart depicted in the accompanying FIGURE, reference numeral 10 represents a digestion tank. Ilmenite ore is adapted to be fed into digestor tank 10 from ilmenite storage bin 11. Dilute sulfuric acid having a concentration between about 25% and about 60% by weight, based upon the total weight of the acid solution, is adapted to be fed either from a mixture of strong acid (96% by weight) from a source 12 of fresh acid and recycled acid (15% to 22% by weight) or water directly to digestor tank 10. The ilmenite ore and dilute sulfuric acid in digestor tank 10 are agitated continuously at a temperature up to the boiling point of the acid solution in the tank.

The reactants in digestor tank 10 are preferably maintained at a temperature between about 70° C. and about 140° C. More specifically, the reactants in digestor tank 10 are preferably maintained at 110° C. Digestor tank 10 may be maintained at any convenient pressure; atmospheric pressure is preferred for reasons of economy.

The reaction mixture is continuously transported from digestor tank 10 to a separator device 13, e.g., a cyclone separator, in which a portion or all of the unreacted ilmenite ore is separated and recycled by way of recycle conduit 14 to digestor tank 10. Alternatively, the reaction mixture may be continuously transported from digestor tank 10 to digestor tank 15 unaccompanied by recycling any of the unreacted ilmenite ore to digestor tank 10.

The reaction solution in digestor tank 15 is preferably maintained at a temperature somewhat lower than the temperature in digestor tank 10. For example, the reaction mixture in digestor tank 15 is maintained at about 100° C. Control of the temperature in digestor tank 15 may be achieved by the addition of recycled acid or water. The pressure in digestor tank 15 is preferably atmospheric, but higher pressures may be utilized if desired.

The reaction mixture may be continuously transported from digestor tank 15 to a separator device 16, e.g., a cyclone separator, in which a portion or all of the unreacted ilmenite ore is separated and recycled by way of recycle conduit 17 to digestor tank 15. Alternatively, the reaction mixture may be continuously transported from digestor tank 15 to digestor tank 18 unaccompanied by the recycle of any of the unreacted ilmenite ore to digestor tank 15.

The reaction mixture in digestor tank 18 is preferably maintained at about 70° C. and atmospheric pressure. Control of the temperature in digestor tank 18 may be achieved by the addition of recycled acid or water.

The reaction mixture from digestor tank 18 is continuously fed to a suitable separator device 19, e.g. a liquid cyclone separator (or multiples thereof in series and/or parallel flow arrangement), in which the unreacted ilmenite ore is separated from the liquid reaction product. The excess or unreacted ilmenite is recycled by way of conduits 21 and 21' to either or both digestor tank 18 and/or digestor tank 10. The liquid reaction product from separator device 19 is conveyed to settler device 20, e.g., a conventional settler device or a Lamella ® device, in which gangue or other undesirable solids material are removed from the reaction product. The use of a LAMELLA ® settling device is not considered a part of this invention.

As indicated above, the digestion reaction is conducted in digestor tanks 10, 15 and 18. It is not essential that the digestion reaction be conducted in three digestor tanks. In fact, the process may be conducted batchwise using only one digestor tank. However, it is preferred to use two or more digestor tanks in order to practice the process in a continuous manner. When utilizing only two digestor tanks, the temperature of the second digestor tank, such as digestor tank 15, may be adjusted to a lower temperature as, for example, 70° C.

The temperature at which the digestion reaction occurs is between about 65° C. and the boiling point of the acid solution, i.e., between about 65° C. and about 140° C. Selecting a temperature that is too low in the first digestor tank, e.g., digestor tank 10, should be avoided because the digestion reaction will proceed too slowly and thus require increased residence time of the reactants in the digestor tank. Also, increased residence times should be avoided to preclude the risk of undesirable nuclei formation in the reaction solution which, in turn, promotes premature hydrolyzation of the titanium salt. Selecting a temperature above 140° C. is not recommended because the titanium salt hydrolyzes at higher temperatures. Therefore, the preferred operating temperature for conducting the digestion reaction is between about 70° C. and 110° C.

Also, each digestor tank should be equipped with suitable agitation means, indicated by reference numeral 9 in the accompanying flow diagram, in order to maintain the reactants and the reaction solution well agitated.

The salient features of the present process reside in the discovery that ilmenite ore may be reacted with dilute sulfuric acid to provide a hydrolyzable titanyl sulphate solution for making titanium dioxide pigments if an excess of ilmenite ore, i.e., up to 4 times the stoichiometric amount required for reacting with sulfuric acid, is employed and if the temperature of the reaction solution is maintained below about 100° C. when the ratio of active acid to titanium dioxide of the solution falls below about 2.5 (i.e., a range of about 2.0 to about 3). The term "active acid" means the total quantity of free acid in the reaction solution plus the acid combined with the titanium in the reaction solution. The ratio of active acid to titanium dioxide (active acid: titanium dioxide) is calculated as the sum of both the free acid in solution plus the acid combined with the titanium in solution divided by the titanium in solution (calculated as $TiO_2$). For example, the active acid content of a solution may be determined by titration of a selected sample (by weighing or pipeting techniques) with a 0.5 N caustic solution (NaOH) to a pH of 4.0 in a barium chloride/ammonium chloride buffered solution. The titration yields the content of free acid plus the acid combined with the $TiO_2$ which is referred to as active acid. To illustrate, 60 mls of buffer solution containing 75 g/l of barium chloride and 250 g/l of ammonium chloride is added to the beaker containing the related sample and diluted with water to 250 mls and titrated with 0.5 N caustic to the methyl orange end-point.

In addition, it has been discovered that use of excess ilmenite ore in the digestion reaction is effective and desirable for achieving a successful and workable process according to the present invention without excessive grinding of the ore. The titaneferous ore should have a surface area ranging between about 0.05 $m^2/cc$ to about 0.6 $m^2/cc$. Ore having a higher surface area could be used but provides no advantage because of increased grinding costs. As indicated hereinabove, an excess of ilmenite ore between 10% and 400% of the stoichiometric amount necessary for reacting with sulfuric acid should be employed in the digestion reaction of the process. The use of lesser amounts of ilmenite ore results in unacceptably low reaction rates and long processing times so that the process becomes economically unattractive. Using amounts of excess ilmenite higher than recommended hereinabove is undesirable due to greatly reduced fluidity of the reaction mixture and the need to recycle large quantities of unreacted ilmenite ore to the first digestion tank of the process. It has been observed unexpectedly, for example, that doubling the amount of ilmenite ore above the stoichiometric amount for reacting with dilute sulfuric acid increases the rate of reaction in the order of at least 10 times in the last digestor.

As indicated hereinabove, the sulfuric acid utilized in the process of the invention should have a concentration of between about 25% and about 60% by weight, based upon the total weight of the acid solution. An acid concentration below about 25% by weight is not desirable because hydrolysis of the titanium dioxide occurs during and in conjunction with the digestion reaction when using such acids. Premature hydrolysis of titanium salt solutions precludes the formation of pigment grade titanium dioxide at a later stage of the process. Also, utilizing an acid having a concentration greater than about 60% by weight is not desirable because (1) the resulting reaction solution is more viscous and difficult to handle, (2) the economics of recycling spent acid are not realized unless the spent acid is concentrated, which unnecessarily increases the cost of operation, and (3) promotes the precipitation of ferrous sulphate monohydrate which is difficult to remove by filtration since fine gel particles readily clog filter elements and the density characteristic makes gravity separation ineffective.

The process operating conditions for conducting the digestion reaction may readily be adjusted, depending upon the concentration of the dilute sulfuric acid and the specific amount of excess ilmenite that are employed, to provide optimum process operation. To illustrate, utilizing dilute sulfuric acid of low concentration, e.g., below 40% by weight, initially requires operating the process at a lower temperature of the preferred temperature range because of the lower boiling point of the dilute sulfuric acid. As the digestion reaction progresses, it is, however, desirably in this instance to increase the amount of ilmenite ore employed so as to digest as much ilmenite ore as possible in the first digestor tank at which point the operating temperature is usually higher. As noted hereinbefore, the temperature in subsequent digestor tanks is maintained at a level lower than the first digestor tank and, ultimately, must be reduced to preclude or avoid premature hydrolysis of the titanium salt solution.

The preferred operating temperatures for conducting the digestion reaction in two digestor tanks or stages are that wherein the first digestor tank is maintained at 110° C. and the second digestor tank is maintained at 72° C. The preferred operating temperatures for conducting the digestion reaction in three digestor tanks, or stages, are that wherein the first digestor tank is maintained at 110° C., the second digestor tank is maintained at 100° C. and the third digestor tank is maintained at 75° C.

Thus, one of the essential and salient features of the invention providing an operable process is that wherein the temperature of the digestion reaction is decreased as the reaction progresses thereby to preclude or avoid premature hydrolysis of the resulting titanium salt solution. Premature hydrolysis of the titanium salt solution precludes the formation of pigment grade or quality titanium dioxide at a later stage of the process.

The duration of the digestion reaction in the first digestor tank is controlled by the optimum degree of conversion or digestion of the ilmenite ore at that stage. Generally speaking, it is preferred to digest or react as much of the ilmenite ore as is possible in the first digestor tank or stage whereat the temperature is maintained at the highest level. Ordinarily, it is possible to digest in the first stage up to about 80% by weight (stoichiometric) of the ilmenite ore charged to the process, not counting the excess ore. Preferably, between about 50% and 70% by weight (stoichiometric) of the ilmenite ore is digested in the first stage, not including the excess ore.

Temperature control of the digestion reaction is preferably achieved by monitoring the ratio of active acid to titanium in the reaction solution. As noted above, the temperature of the reaction solution should be maintained below about 100° C., and preferably below about 75° C. as the ratio of active acid to titanium (calculated as titanium dioxide) falls to about 2.0. To illustrate, the temperature of the reaction solution in the first stage or digestor of the digestion reaction should be maintained at a temperature below about 140° C., e.g., 110° C., until the ratio of active acid to titanium dioxide of the reaction solution falls to about 3.0, at which time the temperature of the reaction solution is reduced to below about 100° C., e.g., 70° C.

As noted on the accompanying flow chart, a suitable reductant such as, for example, iron or titanous sulphate, from container 22 may be added to digestor tank 10 or digestor tank 15, or to both tanks, for the purpose of reducing trivalent iron (ferric) in the digestion solution to divalent iron (ferrous) thereby to preclude contamination of later obtained titanium hydrate with ferric salts. The amount of reductant added to the reaction solution in the digestors is dependent upon the amount of ferric iron in the ilmenite feed ore. Generally speaking, between about 3% and about 8% by weight, based upon the total weight of ilmenite ore reacted, of reductant is adequate to provide satisfactory results and process operation when using an ilmenite ore that contains 5% to 13% $Fe_2O_3$. The addition of a reductant such as iron has another beneficial effect in that it accelerates the rate of the digestion reaction. Thus, it is possible by this measure to avoid a separate reduction stage for the digestion solution as would otherwise be necessary. The reductant may be added at any point in the digestion operation. The quantity of reductant used is chosen so that not only all of the trivalent iron in the ilmenite ore is converted to the divalent state, but also part of the titanium in the reaction solution is reduced to the trivalent state in order to obtain a titanium sulphate solution for the hydrolysis that contains sufficient trivalent titanium. The presence of trivalent titanium reduces the formation of ferric iron which would adsorb on the titanium dioxide particles in the subsequent hydrolysis step of the process. Incidentally, the accelerating effect of the iron on the rate of the digestion reaction increases as the particle size of the iron decreases; on the other hand, the yield of trivalent titanium in the final digestion solution is decreased.

It should be noted that the digestion reaction of the process of the present invention may be accomplished as a batch reaction, e.g., in a reaction vessel from which the reaction mixture, after the digestion reaction has proceeded to a desired extent, is withdrawn and processed further in other vessels. A preferred embodiment of the process of the invention is that wherein the digestion reaction is performed continuously in at least two reaction vessels and wherein the ilmenite ore and the dilute sulfuric acid are made to flow cocurrently.

A certain quantity of metal sulphates are usually precipitated during the digestion reaction without any noticeable deterioration in the fluidity of the reaction mixture. The metal sulphates may easily be dissolved at the end of the digestion reaction by the addition of water. At least part of the water may be substituted by titanium sulphate solution which has been freed from a large part of the iron sulphate (by crystallization and separation of ferrous sulphate heptahydrate at a later step of the process discussed below). By this measure, the addition of extra water to the system can be minimized or avoided. Ordinarily, additional water must be removed at a later stage in the process, e.g., by vaporizing.

The water or solution of water and titanium sulphate may be added to the reaction solution in the last digestor tank or at some convenient point between the last digestor tank and separator device 19 to provide cooling. The addition of water or solution of water and titanium sulphate is not considered a part of this invention.

The reaction solution from settler device 20 consists of sulphate salts of iron, titanium and trace elements from the ilmenite feed material. The reaction solution is conducted from settler device 20 to a crystallizer device 23 wherein the copperas (i.e., ferrous sulphate heptahydrate) is crystallized and removed by known process measures. For example, the solution is cooled in a continuous or batch vacuum crystallizer to about 10° C. to 20° C. by pulling a vacuum of 29 inches of mercury to form large crystals of copperas ($FeSo_4.7H_2O$) which can easily be filtered on a drum or table filter. The cake of copperas may be washed to recover the soluble titanium values. The reaction solution from the filter may be concentrated by known measures, e.g., evaporation, prior to being subjected to hydrolysis. Also, the reaction solution may be clarified either before or after crystallization and removal of the ferrous sulphate heptahydrate. A clarification step prior to crystallization is favorable if it is desired to obtain a ferrous sulphate heptahydrate of high purity which may be processed further, e.g., for producing reagents which will be employed for the purification of water and sewage.

As a rule, the reaction solution is subjected to a fine filtration step prior to hydrolysis. After removing the ferrous sulphate heptahydrate and, if necessary, clarifying and fine filtrating, a titanium sulphate solution is obtained having a favorable ratio of $Fe:TiO_2$ that can be directly hydrolyzed or, optionally, evaporated by known means in a vacuum evaporator to the desired $TiO_2$ concentration, followed by hydrolysis.

The reaction solution from crystallizer 23 consists of titanyl sulphate ($TiOSO_4$) solution which is fed into hydrolyzer device 24 wherein the titanyl sulphate is hydrolyzed by known process measures to provide titanium dioxide hydrate. Specifically, the titanyl sulphate solution is hydrolyzed to provide insoluble titanium dioxide hydrate by diluting the titanyl sulphate solution with water at elevated temperatures. For example, a predetermined amount of titanyl sulphate solution having a titanium dioxide content of preferably greater than 200 grams per liter is preheated to a temperature above 90° C. and added with agitation to clear water at substantially the same temperature and in the ratio of 3 to 4½ parts of solution to one part of water. The solution is subjected to boiling and titanium dioxide in the form of colloidal particles is precipitated; the colloidal particles flock to product a filterable titanium dioxide hydrate. The manner and means of conducting the hydrolysis step is well known in the art and described, for example, in U.S. Pat. Nos. 1,851,487 and 3,071,439.

Following hydrolysis, the titanium dioxide hydrate is filtered in a filtering device 25, e.g., a Moore filter, and the resulting filter cake is fed into calciner 26 wherein it is heated in a known manner to remove water of hydration and adsorbed sulfuric acid to provide titanium dioxide suitable for pigment grade.

A significant advantage of the process of the present invention is that it reduces or even eliminates the severe "spent acid" disposal problem that is characteristic of the conventional sulphate process for the manufacture of titanium dioxide pigment. Specifically, the spent acid resulting from the digestion, crystallization and hydrolysis steps of the process are reprocessed or recycled for use in conducting the digestion reaction with ilmenite ore. Thus, the process of the present invention is free or substantially free of waste spent acid.

To illustrate, the spent acid from filter 25 is conducted by conduit 27 and returned to digestor tank 10. If desired, the spent acid from filter 25 may be concentrated as by evaporation in a known manner in concentrator device 28 prior to being returned to digestor tank 10.

An additional and significant advantage of the process of the present invention is that the recycled spent acid may be introduced directly into any one or all of the digestor tanks to control the temperature in each digestor tank. The foregoing provides a convenient and effective manner for balancing and controlling the reaction temperature between the reactors.

The principle and practice of the present invention is illustrated in the following Examples which are exemplary only and it is not intended that the invention be limited thereto since modifications in technique and operation will be apparent to anyone skilled in the art. All parts and percentages specified herein are by weight unless otherwise indicated.

Procedures and tests specified herein and in the Examples herebelow were conducted as follows:

SURFACE AREA was measured by the sedimentation method described in: Jacobsen, A. E. and Sullivan, W. F., "Method For Particle Size Distribution fot the Entire Subsieve Range," Vol. 19, Page 855 Analytical Chemistry (November, 1947).

EXAMPLE 1

800 grams of titaneferous ore (MacIntyre Ore) having a surface ore of 0.39 $m^2/cc$ (measured by sedimentation method) was charged to a reactor vessel. 1.16 liters of 43% by weight sulfuric acid was added to the reaction vessel. The temperature of the reactants was raised to 108° C. by heating under constant agitation with an agitator made of Teflon®. After fifty minutes, a 15 cc sample of the reaction solution was filtered by gravity through a glass filter paper into a 100 ml polypropylene beaker. The filtrate was analyzed for active acid content and titanium content (expressed as $TiO_2$). The active acid content was 430 g/l to provide a ratio of active acid: titanium of 7.1.

The conversion of the reaction was determined after about 1¼ hours by analyzing a sample of the reaction solution. The filtrate analyzed had an active acid content of 396.9 g/l $H_2SO_4$ and a titanium content of 78.5 g/l ($TiO_2$).

After about 1¼ hours, 9 grams of powdered iron was added to the reaction vessel to provide a reductant for the ferric iron content of the reaction solution.

After about 1¾ hours, the reaction solution was quenched to 70° C. by placing the reaction vessel in a tray of cooling water. After quenching, analysis of the reaction solution showed an active acid content of 353.3 g/l $H_2SO_4$ and a titanium content of 89.25 g/l ($TiO_2$) providing a ratio of active acid: titanium of 3.96.

The reaction solution was maintained at a temperature of 70°–74° C. for about 15 hours. The reaction solution was cooled to a temperature of about 50° C. and analyzed for active acid and titanium content. The active acid content was 275.8 g/l and the titanium content was 136.2 g/l ($TiO_2$) to provide a ratio of active acid: titanium of 2.025.

The reaction solution was stable and suitable for hydrolysis to prepare titanium dioxide pigment.

EXAMPLE 2

A two-stage pilot plant system was constructed consisting of a heated, agitated 5-liter first stage reactor overflowing into a heated, agitated 25-liter second stage reactor. Ilmenite ore having a particle size distribution as follows (U.S. Standard Screens):

| Mesh | Wt % |
|---|---|
| +100 | 1.2 |
| +200–100 | 35.8 |
| +325–200 | 23.0 |
| +400–325 | 6.0 |
| −400 | 34.0 | and containing 46.8% $TiO_2$ was continuously fed into the first stage at a rate of 3.78 gms/minute. A solution having the following analysis:

| 29.9% | Free $H_2SO_4$ |
| 1.4% | Reduced Titanium (as $TiO_2$) |
| 3.3% | Soluble Titanium (as $TiO_2$) | was also fed into the first stage at a rate of 12.5 milliliters/minute. Both stages were initially charged with sufficient ore to provide a 100% excess over the stoichiometric requirement. Unreacted ore overflowing from the second stage was recycled to the first stage, in order to maintain this excess ore in the system. The first stage reactor was controlled at 106° C. while the second stage reactor was controlled at 71° C. After sufficient time elapsed for equilibrium to be established, it was found that 54.2% of the $TiO_2$ in the ore feed was reacted in the first stage, and 28.2% was reacted in the second stage. An overall conversion of 82.4% was achieved with the two stages. Analysis of the final product was:

9.4% Soluble Titanium (As $TiO_2$)
9.0% Free $H_2SO_4$
0.3% Reduced Titanium (As $TiO_2$)

EXAMPLE 3

The pilot plant system described in Example 2 was operated with the following feed rates to the first-stage reactor:

3.27 g/min ilmenite ore (46.8% $TiO_2$)
0.19 g/min iron
12.28 g/min of solution containing 42.9% free $H_2SO_4$ and no reduced titanium.

A 100% excess of ore over the stoichiometric requirement was maintained in the system as in Example 2. The first stage reactor was controlled at 106° C. and the second stage at 72° C. After equilibrium had been reached, it was found that 73.9% of the $TiO_2$ in the ore feed was reacted in the first stage and 20.9% in the second stage. An overall conversion of 94.9% was achieved with the two stages. Analysis of the final product was:

8.9% Soluble Titanium (As $TiO_2$)
   8.8% Free $H_2SO_4$
   0.1% Reduced Titanium (As $TiO_2$)

We claim:

1. A process for producing titanium dioxide pigment which comprises
    (1) reacting
        ilmenite, in an amount between 10% and 400% in excess of the stoichiometric amount of ilmenite necessary to react with sulfuric acid to provide titanyl sulphate, and
        dilute sulfuric acid solution having a concentration between about 25% and about 60% by weight, based upon the total weight of said solution,
    at a temperature below about 140° C.; (2) cooling the resulting reaction solution to a temperature below about 100° C.; (3) removing iron sulphate from said reaction solution to provide a titanyl sulphate solution; (4) hydrolyzing said titanyl sulphate solution to provide a hydrate of titanium dioxide; (5) calcining said hydrate of titanium dioxide to provide titanium dioxide and (6) recovering titanium dioxide.

2. The process of claim 1 which includes recycling unreacted ilmenite and recycling spent sulfuric acid from hydrolysis (4) to the feed of ilmenite and the feed of sulfuric acid, respectively, that are reacted in (1).

3. The process of claim 1 or 2 wherein the reaction between said ilmenite and said dilute sulfuric acid is conducted at a temperature below about 140° C. and the resulting reaction solution is cooled to a temperature of about 70° C.

4. The process of claim 3 wherein the reaction between said ilmenite and said dilute sulfuric acid is conducted at a temperature of about 110° C.

5. A continuous process for producing titanium dioxide pigment which comprises:
    (1) reacting (a) ilmenite, in an amount between 10% and 400% in excess of the stoichiometric amount of ilmenite necessary to react with sulfuric acid to provide titanyl sulphate, and (b) dilute sulfuric acid solution having a concentration between about 25% and about 60% by weight, based upon the total weight of said solution, at a temperature below about 140° C.;
    (2) cooling the resulting reaction mixture from (1) to a temperature below about 100° C. in a second reaction vessel;
    (3) separating unreacted ilmenite from the reaction mixture of (2) to provide a solution of iron sulphate and titanyl sulphate and recycling said unreacted ilmenite to (1);
    (4) removing iron sulphate from said solution of iron sulphate and titanyl sulphate to provide a solution of titanyl sulphate;
    (5) hydrolyzing said titanyl sulphate solution from (4) to provide a titanium dioxide hydrate, and recycling spent sulfuric acid to (1);
    (6) calcining said titanium dioxide; and
    (7) recovering titanium dioxide.

6. The process of claim 5 wherein the reaction between said ilmenite and said dilute sulfuric acid of (1) is conducted at a temperature of about 110° C. and the resulting reaction solution of (2) is cooled to a temperature of about 70° C. to complete the reaction.

7. The process of claim 5 wherein the reaction of (1) is conducted in at least two stages in which said ilmenite and said dilute sulfuric acid are reacted in a first stage to provide a reaction solution having a ratio of active acid to titanium in the range of between about 2.2 and about 3.5 and thereafter conducting said reaction in a second stage at a temperature below about 90° C.

8. The process of claim 7 wherein the temperature of the reaction in said first stage is between 65° C. and 140° C.

9. The process of claim 7 wherein said reaction is conducted by feeding said ilmenite and said dilute sulfuric acid cocurrently into said first stage.

10. The process of claim 5 wherein the reaction of (1) is conducted in three stages in which said ilmenite and said dilute sulfuric acid are reacted in a first stage at a temperature of about 110° C. to provide a reaction solution having a ratio of active acid to titanium dioxide in the range of between about 2.5 and above about 3.0, and thereafter conducting said reaction in a second stage at a temperature of about 100° C. to provide a reaction solution having a ratio of active acid to titanium dioxide in the range between about 2.2 and about 2.5 and thereafter completing said reaction in a third stage at a temperature below about 80° C. to provide a reaction solution having a ratio of active acid to titanium dioxide of about 2.0.

11. A continuous process for producing titanium dioxide pigment which comprises:
    (1) reacting (a) ilmenite, in an amount between 10% and 400% in excess of the stoichiometric amount of ilmenite necessary to react with sulphuric acid to provide titanyl sulphate, and (b) dilute sulfuric acid solution having a concentration between about 25% and about 60% by weight, based upon the total weight of said solution, in a first reaction vessel at a temperature below about 140° C. to provide a reaction solution having a ratio of active acid to titanium dioxide of about 3.0;
    (2) continuously transporting said reaction solution from said first reaction vessel to a second reaction vessel, and recycling a portion of unreacted ilmenite to (1);
    (3) continuing said reaction of ilmenite and dilute sulfuric acid in said second reaction vessel at a temperature below about 90° C. to provide a reaction solution having a ratio of active acid to titanium dioxide of about 2.0;
    (4) separating unreacted ilmenite from the reaction mixture of (3) to provide a solution of iron sulphate and titanyl sulphate, and recycling said unreacted ilmenite to (3) or (1);
    (5) cooling the reaction solution of (4) to crystallize iron sulphate;
    (6) filtering the reaction mixture of (5) to remove iron sulphate crystals and provide a solution of titanyl sulphate;
    (7) hydrolyzing said solution of titanyl sulphate from (6) to provide a titanium dioxide hydrate, and recycling spent sulfuric acid to (1);
    (8) calcining said titanium dioxide hydrate from (7) to provide titanium dioxide; and
    (9) recovering titanium dioxide.

12. A continuous process for producing titanium dioxide pigment which comprises:
    (1) reacting (a) ilmenite, in an amount between 10% and 400% in excess of the stoichiometric amount of ilmenite necessary to react with sulfuric acid to provide titanyl sulphate, and (b) dilute sulfuric acid solution having a concentration between about 25% and about 60% by weight, based upon the total weight of said solution, in a first reaction vessel at a temperature below about 140° C. to provide a reaction solution having a ratio of active acid to titanium dioxide of between about 3.0 and about 7.0;

(2) continuously transporting said reaction solution from said first reaction vessel to a second reaction vessel, and recycling a portion of unreacted ilmenite to (1);

(3) continuing said reaction of ilmenite and dilute sulfuric acid in said second reaction vessel at a temperature of about 100° C. to provide a reaction solution having a ratio of active acid to titanium dioxide of between about 2.4 and about 3.5;

(4) continuously transporting said reaction solution from said second reaction vessel to a third reaction vessel and recycling a portion of unreacted ilmenite to (3);

(5) continuing said reaction of ilmenite and dilute sulfuric acid in said third reaction vessel at a temperature of about 80° C. to provide a reaction solution having a ratio of active acid to titanium dioxide of about 2.0;

(6) separating unreacted ilmenite from the reaction mixture of (5) to provide a solution of iron sulphate and titanyl sulphate, and recycling said unreacted ilmenite to (5) or (1);

(7) cooling the reaction solution of (5) to crystallize iron sulphate;

(8) filtering the reaction mixture of (7) to remove iron sulphate crystals and provide a solution of titanyl sulphate;

(9) hydrolyzing said solution of titanyl sulphate from (8) to provide a titanium dioxide hydrate and recycling spent sulfuric acid to (1);

(10) calcining said titanium dioxide hydrate from (9) to provide titanium dioxide; and

(11) recovering titanium dioxide.

* * * * *